Dec. 29, 1970   J. T. THOMPSON   3,551,232
METHOD OF VACUUM FORMING LAMINATED ARTICLES
Filed Dec. 22, 1967

INVENTOR.
James T. Thompson
BY Peter P. Kozak
ATTORNEY

United States Patent Office 3,551,232
Patented Dec. 29, 1970

3,551,232
METHOD OF VACUUM FORMING LAMINATED ARTICLES
James T. Thompson, Dayton, Ohio, assignor to General Motors Corporation, Detroit, Mich., a corporation of Delaware
Filed Dec. 22, 1967, Ser. No. 692,962
Int. Cl. B32b 31/00, 27/38
U.S. Cl. 156—87     4 Claims

ABSTRACT OF THE DISCLOSURE

A thermoplastic sheet is vacuum formed on and bonded to a substrate by applying an adhesive containing an inert particulate filler over the substrate and vacuum forming the thermoplastic sheet over the adhesive layer whereby entrapment of air is avoided and a smooth blister and bubble free surface is obtained.

---

This invention relates to laminated articles and to their production by the vacuum forming process.

It is present day conventional practice to make structural members consisting of a relatively rigid substrate to which is bonded as a surface or cover layer a synthetic resin sheet. The surface layer may be smooth or embossed and may be suitably colored to provide a desired decorative effect. The substrate may be formed of a relatively rigid synthetic resin, such as polystyrene, or sheet metal, and the surface layer and the substrate are bonded together to form a laminate. Such structures may be used for a variety of purposes such as interior automobile panels, glove compartment doors, and the like.

A convenient and economical method for making such articles involves the application of a suitable adhesive to the surface of the substrate and then vacuum forming the decorative cover layer over the adhesive layer of the substrate.

In general, this method is accomplished by first spraying or other wise applying a suitable adhesive over the surface of the substrate to which the cover layer is to be applied. The substrate is then positioned on a buck or fixture adapted to firmly support the substrate and to subject the underside of the substrate to vacuum, the substrate being perforated sufficiently to permit air to be drawn through it. A suitable thermoplastic decorative sheet is then heat softened, draped over the adhesive layer of the substrate and a vacuum state is then applied to the fixture whereby the thermoplastic sheet is drawn to conform to the substrate and into intimate contact with the adhesive whereby the cover sheet is bonded to the substrate. A significant disadvantage of this method, however, is that in the step of vacuum forming the cover sheet over the adhesive layer, the air within the space between the softened sheet and the adhesive is entrapped therein. The entrapped air may cause a poorly bonded structure which is noticeable just after forming due to the appearance of bubbles or blisters in the cover layer. Even though the initial appearance of the article is satisfactory, when it is used as an automobile glove compartment door where under service conditions it is exposed to temperatures over 100° F., the entrapped air expands to cause a bubbling or blistering of the cover layer which is unsatisfactory to the consumer from an esthetic standpoint.

It is the principal object of this invention to provide an improved method of the type described above whereby the aforementioned bubbling and blistering of the cover sheet is substantially eliminated. A more specific object of the invention involves randomly dispersing relatively fine, inert particles which, during the vacuum forming step, provide a myriad of paths between the cover layer and the substrate whcih permit the entrapped air to escape.

These and other objects are accomplished by incorporating in the adhesive to be used in the vacuum forming and bonding process a sufficient quantity of inert particles, such as those taken from the group consisting of polypropylene, polyethylene, silicic acid, ortho magnesium silicate, and silica having a particle size of an average diameter of about at least 74 microns.

Other objects and advantages of the invention will be apparent from the following detailed description of a specific embodiment of the invention which is described by reference to the accompanying drawings wherein.

The invention will now be illustrated in terms of a specific embodiment comprising the manufacture of an automobile glove compartment door. Structurally, the glove compartment door consists of a solid polystyrene substrate having a vinyl resin sheet vacuum formed thereon and bonded thereto by means of an epoxy resin.

Figure 1:
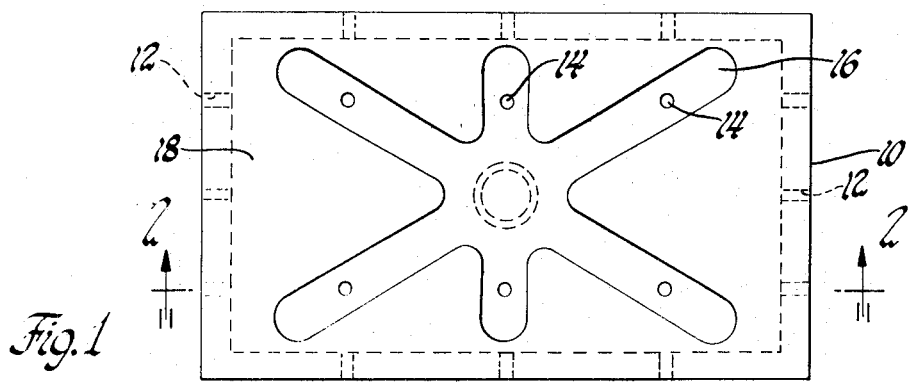
FIG. 1 is a plan view of a diagrammatic representation of a fixture for supporting a substrate over which a decorative cover layer is to be formed.
Figure 2:
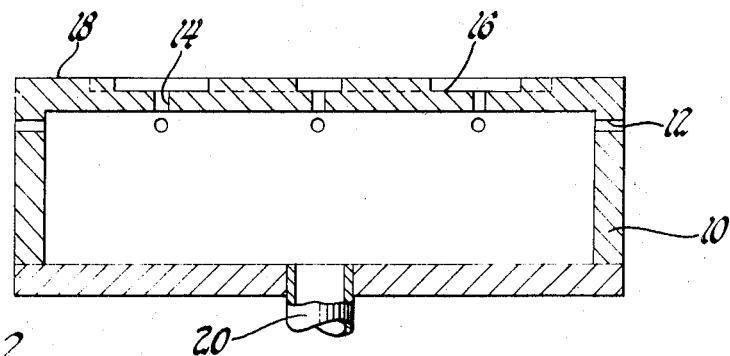
FIG. 2 is an elevation view of the fixture shown in FIG. 1.

Referring to FIGS. 1 and 2 of the drawings, the method involves the use of a fixture or buck 10, which is provided with a plurality of openings 12 on the side walls thereof and openings 14 in a plurality of channels or depressions 16 in the top 18 of the fixture in a well known manner. The interior of the fixture 10 is adapted to be subjected to a vacuum source (not shown) through the conduit 20.

In carrying out the method, the rigid polystyrene substrate 21 of the article is positioned on the top of the fixture 10. It will be appreciated that the openings 14 provided in the channels 16 are operative to subject the underside of the substrate 21 to a vacuum state when it is positioned on the fixture 10 as above described. The substrate 21 is provided with a plurality of fine openings or perforations 22 therethrough whereby the vacuum state may be applied to the top surface of the substrate 21.

Figure 3:
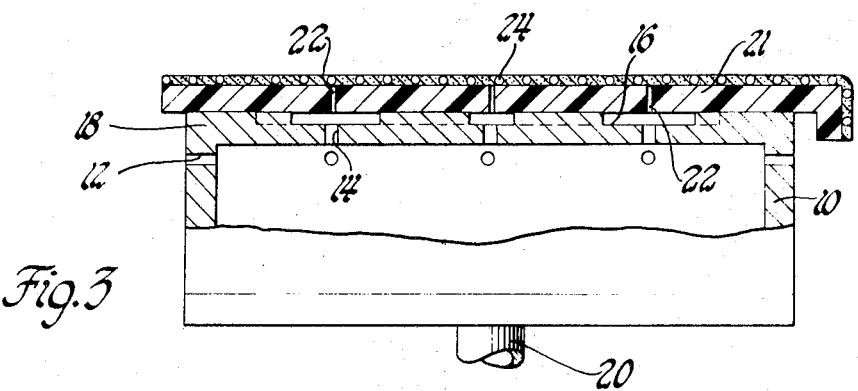
FIG. 3 is the fixture of FIG. 2 with an adhesive coated substrate positioned thereon.

As shown in FIG. 3, an adhesive layer 24 is sprayed or otherwise applied to the top surface of the substrate 21. Preferably, the adhesive layer is applied before positioning it on the fixture 10 for efficiency in the use of the vacuum forming apparatus. In the specific embodiment described herein the adhesive is a heat curable sprayable epoxy resin formulation consisting of 8 parts by volume of a commercial liquid epoxy resin containing 45% by weight solids, 6.6 parts by volume of methyl ethyl ketone solvent, 0.4 part by volume of a commercial polyamide catalyst containing 85% by weight solids, and 1 part by volume of polypropylene particles having an average particle size of about 150 microns. This formulation is thoroughly mixed whereby the polypropylene particles are randomly distributed throughout so that upon being sprayed in a form of a coating 24 onto the substrate 21, as shown in FIG. 3, the polypropylene particles are randomly distributed over the substrate 21. The methyl ethyl ketone readily evaporates to provide a relatively dry, somewhat tacky, curable epoxy adhesive layer.

Figure 4:
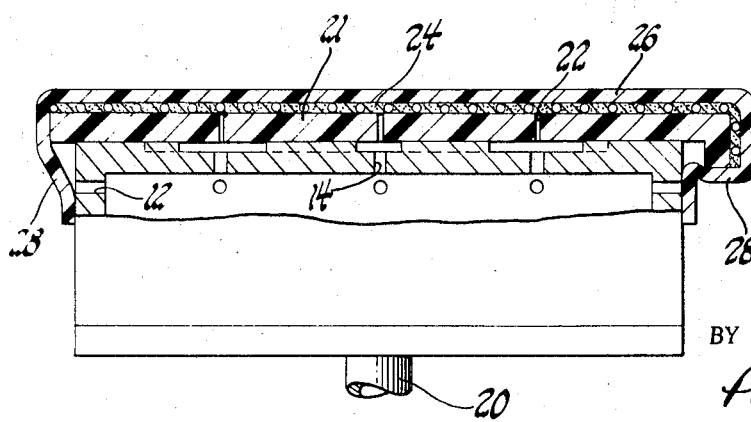
FIG. 4 is a diagrammatic sketch of the assembly of FIG. 3 and additionally of a cover layer vacuum formed in place.

Next, a textured vinyl skin of about 0.04 thickness is heat softened sufficiently for vacuum forming and is applied over the adhesive layer as the cover layer 26, as shown in FIG. 4. The edges 28 of the sheet are manually tucked under the edges of the substrate 21 with the assistance of the pressure differential provided at the openings 12 whereby the sheet 26 is snugly formed over the substrate 21 and under the edges thereof. During the forming operation, the finely divided inert polypropylene particles create a large number or a myriad of paths permitting a rapid and effective evacuation of the air from within the space between the softened sheet and the adhesive to thereby substantially eliminate the formation of any bubbles or blisters in the cover sheet in the subsequent use of the article. The openings 22 of the stubstrate are sufficiently small so that the sheet 26 is not drawn into them to deform it or to interfere with the air evacuation.

In general, the particles must be inert with respect to the adhesive and the solvent. It has been found that the particles must have an average diameter size not less than 74 microns to effect an efficient evacuation of the air or other gases during the vacuum forming process. With an epoxy resin system of the type described, it has been found that particles formed of polypropylene, polyethylene, silicic acid, ortho magnesium silicate, and silica perform satisfactorily. However, the performance of polypropylene particles is markedly superior and is preferred. It has been found that an average particle size in excess of 250 microns is unsatisfactory because such large particles exhibit an excessive telescoping of their image through a vinyl sheet having a thickness of approximately 0.04 inch which is therefore esthetically unacceptable. Of course, if greater sheet thicknesses are involved, larger particle sizes may be tolerated.

The density of the particles in relation to the density of liquid adhesive must be such so that it does not settle excessively in the adhesive or float thereon since each of these conditions would prevent the formation of a random distribution of particles in the adhesive. Further, since it is preferable to apply the adhesive by spraying, particles must not interfere with the proper function of the spraying apparatus. It has been found that polypropylene particles having an average diameter of about 150 microns are ideally suited for this purpose.

It should be appreciated, of course, that the presence of a particulate filler tends to reduce the effectiveness of the adhesive bond between the substrate and the cover layer if present in excessive amounts. On the other hand, if the proportion of the inert filler is too small, they do not function adequately to promote the evacuation of gases during the vacuum forming step. It has been found that proportions of about 4% to about 16% by weight, and preferably about 9% by weight, of the particulate filler based on the weight solids content of the adhesive represent a satisfactory filler content in the adhesive for most applications where the cover layer has only a decorative function.

It will be apparent to those skilled in the art that the invention is applicable to a wide variety of thermoplastic materials which may be vacuum formed over a suitable substrate such as polyvinyl chloride resin, polyvinyl acetate resin, acrylonitrile-butadiene-styrene, and vinyl blends thereof as are well known in the art. Similarly, the invention is applicable to a wide variety of adhesives which may be used and are selected for their adhesive effectiveness as determined by the nature of the substrate and the thermoplastic cover layer. The substrate may, of course, be made of metal, polystyrene, and other rigid and semi-rigid substrate materials. Other inert filler materials meeting the above-described requirements may be used.

Although the invention has been described in terms of a specific embodiment, it will be apparent to those skilled in the art that other modifications and embodiments may be adopted in view of the foregoing, and the scope of the invention is not intended to be limited except by the following claims.

I claim:
1. A method of vacuum forming a smooth synthetic resin thermoplastic surface layer onto a relatively rigid substrate comprising the steps of
    applying a liquid adhesive layer onto said substrate,
    drying said adhesive layer,
    heat softening said surface layer, and
    applying said softened surface layer over said dried adhesive layer and subjecting the said dried adhesive layer to vacuum whereby substantially all of the air between said surface layer and said substrate is withdrawn,
    said adhesive layer including a plurality of randomly distributed inert particulate filler having an average particle diameter of at least about 74 microns in sufficient quantity and distribution to space said surface layer from said substrate at a plurality of points to provide a plurality of paths for the escape of air from said adhesive layer and from between said surface layer and said substrate to the vacuum source to thereby promote the formation of a bond therebetween free of a tendency to blister.

2. Claim 1 wherein said liquid adhesive is a sprayable epoxy resin in solvent solution and said filler is taken from the group consisting of polypropylene, polyethylene, silicic acid, ortho magnesium silicate, and silica, and is present in amounts of from 4% to 16% by weight based on the solids content of said adhesive.

3. Claim 1 wherein said adhesive is a sprayable liquid epoxy resin in solvent solution, said filler having a particle size having an average diameter of about 74 to about 250 microns and said surface layer has a thickness not in excess of about .04 inch.

4. Claim 1 wherein said adhesive is a sprayable liquid epoxy resin in solvent solution and said filler is a polypropylene.

References Cited
UNITED STATES PATENTS

| | | | |
|---|---|---|---|
| 2,978,376 | 4/1961 | Hulse | 156—286X |
| 3,309,254 | 3/1967 | Rowe | 156—240 |
| 3,329,750 | 7/1967 | Growald | 161—161X |
| 3,340,224 | 9/1967 | Sherman et al. | 260—41.5 |
| 3,386,955 | 6/1968 | Nawakowski | 260—47 |
| 3,437,522 | 4/1969 | Fick et al. | 156—3X |

HAROLD ANSHER, Primary Examiner

H. F. EPSTEIN, Assistant Examiner

U.S. Cl. X.R.

156—286, 330; 161—162, 165, 184